United States Patent [19]

Walz et al.

[11] 4,060,355

[45] Nov. 29, 1977

[54] DEVICE FOR THE MANUFACTURE OF FIBERS FROM FUSIBLE MATERIALS

[75] Inventors: Alfred H. Walz, Emmendingen; Paul-Jürgen Hahn, Karlsruhe-Durlach, both of Germany

[73] Assignee: Firma VKI-Rheinhold & Mahla AG, Mannheim, Germany

[21] Appl. No.: 730,084

[22] Filed: Oct. 6, 1976

Related U.S. Application Data

[62] Division of Ser. No. 384,565, Aug. 1, 1973, Pat. No. 4,001,357.

[30] Foreign Application Priority Data

Aug. 2, 1972 Germany ............................ 2237884

[51] Int. Cl.² ....................... B29C 23/00; B22D 23/08
[52] U.S. Cl. ............................................ 425/7; 65/16; 239/DIG. 7; 417/151
[58] Field of Search ................... 425/6, 7; 65/2, 5, 16; 239/DIG. 7; 417/151, 171, 197

[56] References Cited

U.S. PATENT DOCUMENTS

| 2,219,346 | 10/1940 | Thomas et al. ...................... 425/6 X |
| 3,545,886 | 12/1970 | Chalom ........................... 417/151 X |

FOREIGN PATENT DOCUMENTS 1,235,302  5/1960  France ........................... 239/DIG. 7

Primary Examiner—Robert D. Baldwin
Attorney, Agent, or Firm—Browdy and Neimark

[57] ABSTRACT

A process and apparatus for the manufacture of fibers from fusible materials and particularly materials of low viscosity. The melt and gaseous flow medium is passed through a Laval-nozzle at a supersonic speed. The nozzle and speed are so selected as to cause an abrupt temperature drop in the flow medium within the nozzle which causes the melt to solidify into fibers.

7 Claims, 3 Drawing Figures

DEVICE FOR THE MANUFACTURE OF FIBERS FROM FUSIBLE MATERIALS

This is a division of application Ser. No. 384,565, filed Aug. 1, 1973, now U.S. Pat. No. 4,001,357.

The present invention relates to apparatus for the manufacture of fibers from fusible materials and, more particularly, fibers from inorganic, for instance metallic, from mineral or from organic substances. The initial substance is melted in a heated crucible and a preferably low-viscosity melt issues from at least one opening in the bottom of the crucible. The melt is separated into fibers by means of a gaseous medium in an associated channel (Laval-nozzle) preferably symmetric with respect to rotation and generating supersonic flow, where it solidifies.

The invention further relates to a device for the manufacture of fibers from fusible materials of the kind initially described including a heatable crucible with at least one orifice in the bottom thereof, at least one channel (Laval-nozzle) generating supersonic flow and located underneath the crucible bottom orifice, and means for supplying and feeding a gaseous medium.

The invention further relates to a device for generating supersonic flow.

The generation of fibers of finite length from high temperature inorganic melts in accordance with the prior art nozzle blowing process (W. German Pat. No. 1,190,135) will only succeed if the melts are sufficiently viscous or if they are provided with a sufficiently large ratio of viscosity to surface tension.

Melts of inorganic, for instance metallic substances, wherein the ratio of viscosity to surface tension is only very small — this as a rule being equivalent to a very narrow temperature range, i.e., with a defined melting point — essentially will be pulverized when making use of the known nozzle blowing process. The end product solidified during the cooling of the process essentially is in the shape of spheres as opposed to the desired fibers.

Two intermediate phases may be observed for sufficiently high temperature levels between the location of the melt exit, for instance the bottom orifice of an iridium or molybdenum crucible, in an ambience of protective gas, and the location of the occurrence of the solidified spherical end-product, namely:

1. a melt (liquid) film;
2. fiber-like, but nevertheless liquid, formations which on account of hydrodynamic instability ultimately will, under the influence of surface tension, divide into a large number of droplets.

The present invention addresses the task of avoiding droplet formation.

This problem essentially is solved by the present invention in so selecting the speed in a channel (Laval-nozzle) generating supersonic flow in flow direction $x$ that supersonic speed will be obtained after the narrowest location and that a temperature drop of the flow medium occurs at a given path segment $\Delta x$ within a short time interval $$\Delta t = \Delta x / U_{mean}$$

and that the melt medium in the fiber state is thereby made to solidify.

Therefore, the temperature of the flow medium surrounding the fiber-like structures and carrying them along will be lowered during the fiber-phase, that is, prior to decomposition into droplets, and more or less abruptly, i.e., in a sufficiently short time to below the melting temperature, and thus the previously liquid medium will solidify in fiber-form. The state of the fiber following solidification may be amorphous or polycrystalline depending on the kind of the medium and the nature of the temperature drop. As a rule, the polycrystalline state will be preferably on account of likely higher material strength characteristics.

In order to generate supersonic speed, the pressure ratio of the pressure at inlet location $P_1$ to that at the outlet location $P_3$ of the Laval-nozzle is selected as smaller than the critical value of 0.53.

According to an advantageous structure, to accomplish the process of the present invention, the pressure ratio for the generation of supersonic flow is caused by an injector, which, in turn, is operated by supersonic flow, of a drive medium supplied at its outer periphery and of sufficiently high pressure and flow rate.

When making the crucibles of base metals such as molybdenum, the flow gas advantageously will be an inert protective gas of 80 – 98% $N_2$ with the remainder $H_2$. An inert protective gas also advantageously serves as drive medium for the injector and, if necessary, may be recovered in closed loop operation. When making the crucibles of noble metals, compressed air may be used as the drive medium for the injector.

A Laval-nozzle, known per se, is particularly suitable as a flow device meeting the requirement of an optimum nozzle blow process as well as that of the invention in a short time following temperature shock.

If a pressure ratio $p_3/p_1$ of about 0.53 is set with respect to the pressure $p_1$ at the inlet side where the velocity, $U_1 = 0$ and where the medium to be separated in fibers is still being carried in liquid, single thread form, and to the pressure $p_3$ at the outlet side, then the speed of flow $U_2$ at the narrowest location 2 will be exactly equal to the speed of sound $a$.

The temperature ratio, with $k = 1.4$ for air:

$$T_2/T_1 = (p_2/p_1)^{(k-1)/k} = (p_2/p_1)^{0.286} = 0.83$$

The flow medium may be brought to supersonic speed behind this most narrow location if 1. the pressure ratio $p_3/p_1$ is less than 0.53 and
2. the cross-section of the Laval-nozzle behind this most narrow location will again be enlarged. As is known, U will always remain equal to a at the most narrow location, regardless of how small a value of $p_3/p_1$ is being selected.

The cross-section F(x) behind the most narrow location of the Laval-nozzle in accordance with the known laws of gas dynamics determines the speed U, the pressure $p$ and — in accordance with the laws of thermodynamics — also the temperature T. One obtains, therefore, the temperature ratio $T(x)/T_2$ as the following relation:

$$F(x)/F_2 = f[U(x)/a] = f(M(x))$$

wherein $M$ — local Mach number, $M — U/a$.

In particular, when $k — 1.4$ for air, $$T(x)/T_1 = [p(x)/p_1]^{0.286}$$

By means of a functional cross-section F(x) fitted to the temperature, one may achieve a temperature drop of the blowing medium along a predetermined short segment $\Delta x$ and within an associated short time $$\Delta t = \Delta x/U_{mean} \approx 2\Delta x/(U_2 + U_3)$$

The thread temperature follows the temperature of the flow medium with a certain time lag because there must be heat transfer between the two media. For the very small thread diameters (of the order of a micron) being considered, the thread surface may be considered very large compared to the volume and the time lag may be considered negligibly small.

Two examples of execution of the process of the present invention will be discussed in greater detail:

FIRST EXAMPLE: ROCKWOOL

The raw material was of the following composition:

| | | | |
|---|---|---|---|
| $SiO_2$ | 51.7% | CaO | 29.9% |
| $Al_2O_3$ | 8.0% | MgO | 4.0% |
| $Fe_2O_3$ + FeO | 3.3% | $Na_2O + K_2O$ | 3 % |
| $TiO_2$ | 0.6% | $SO_3$ | 0.2% |

The thermoplastic range extends from about 800° to about 1,450° C.

The melting temperature in the Pt-Rh crucible (80–20 = 80% Pt, 20% Rh) ranges from about 1,350° to 1,450° C.

A fiber product is produced with a fiber diameter of about 0.5 to 3 × $10^{-3}$ mm and of a length of about 5 to 20 mm.

The quantity produced amounted to about 15 to 30 gram per crucible bottom orifice (about 1.4 mm in diameter) per minute. The viscosity was:

$$\mu(\theta) : \log_{10}(\log_{10}\mu) \approx 0.630 - 3.23 \log_{10}(\theta - 1000)$$

wherein $\theta$ in ° C. and $\mu$ in poises.

The table below lists the pressures, speeds and temperatures at the individual locations of the device.

TABLE I

| LOCATION (see FIGS. 1 & 2) | 1 | 2 | 3 | 3' | 4 | 4' | 15 |
|---|---|---|---|---|---|---|---|
| p kg/cm² (atm) | 1.0 | 0.528 | 0.300 | 0.200 | 6.0 | P4'/p4 = 0.15 | ca 1.0 |
| U m/s | 0 | 340 | 412 | 472 | 0 | — | few m/s |
| M=U/a | 0 | 1.0 | 1.4 | 1.7 | 0 | 1.9 | ~0 |
| T ° K | 300 | 249 | 215 | 189 | 300 | — | 300 |

$\Delta x = x_3 - x_2 = 5$ mm = length of the path of appreciable separation into fibers (selected)
$\Delta t = 2 x/(U_2 + U_3) = 5 \times 10^{-3}/376 = 1.33 \times 10^{-6}$ = seconds (time of separation into fibers)
$\Delta T = T_2 - T_3 = 34°$ C. = temperature (slight for rockwool on account of large thermoplastic temperature range, see above)

SECOND EXAMPLE (KAOWOOL)

The raw material was of the following composition:

$SiO_2 = 50\%$ $Al_2O_3 = 50\%$

The thermosplastic range extends from 1750° to 1,800° C. The melting temperature is an iridium crucible (100% iridium) was about 1,800° C.

The following fiber products were obtained:
about 0.5 to 3.0 × $10^{-3}$ mm. in diameter (thread diameter)
about 2 to 10 mm in length.

Thus, there were practically no non-fiberlike residues (beads). The amount produced was about 7 to 10 grams per bottom orifice of crucible (about 0.9 mm in diameter) per minute. The viscosity is not known from the literature but it is considerably lower than for rockwool in the temperature range where separation into fibers is feasible. The supersonic speed is indispensable in the range of 3,3'.

Table II below shows the pressures, speeds and temperatures at the diverse locations:

TABLE II

| Location See FIGS. 1 & 2 | 1 | 2 | 3 | 3' | 4 | 4' | 15 |
|---|---|---|---|---|---|---|---|
| p kg/cm² (atm) | 1.0 | 0.528 | 0.20 | 0.15 | 6 | P4'/P4 =0.10 | 1 |
| U m/s | 0 | 340 | 472 | 502 | 0 | — | few m/s |
| T °K | 300 | 249 | 189 | 174 | 300 | — | 300 |
| M=U/a | | 1.0 | 1.7 | 1.9 | 0 | 2.2 | ~0 |

$\Delta x = x_3 - x_2$ 5 mm = length (selected) over which there is appreciable separation into fibers.
$\Delta t = x/(U_2 + U_3)/2 = 5 \times 10^{-3}/506 \approx 1.23 \times 10^{-6}$ seconds (time for separating into fibers)
$\Delta T = T_2 - T_3 = 60°$ C. = temperature drop (shock) –(appreciable for kaolin on account of narrow thermoplastic temperature range, see above).

The invention also relates to a device for the manufacture of fibers from fusible materials, in particular fibers from inorganic materials such as metallic ones, from mineral substances or organic substances, where the device is provided with a heatable crucible with at least one orifice in the bottom of that crucible, with at least one channel (Laval-nozzle) below the crucible bottom orifice and generating a supersonic flow, and with means for supplying a gaseous medium.

The invention is characterized in that the cross-section of the Laval-nozzle in the x-flow direction is so chosen that a temperature drop of the blowing medium along a predetermined path segment $\Delta x$ behind the most narrow location is achieved within an associated short physical time interval $\Delta t$, $$\Delta t = \Delta x/U_{mean}$$

which causes the melt medium being carried along in the fiber state to solidify.

By varying the temperature $T_1$ of the flow medium entering the Laval-nozzle (for instance air or inert gas), optimum adaptation of the material to be separated into fibers to the temperature-dependence of the viscosity may be obtained by means of a further advantage of the invention.

Advantageously, the heatable crucible consists of coaxial cylindrical walls provided at their upper ends with current feeds and their lower ends being conductively interconnected, the material to be melted being introduced in the annular space between the inner and outer cylindrical walls. The crucible appropriately is made of noble metals or from alloys of noble metals (iridium, platinum, rhodium) with sufficiently high melting points.

Advantageously several melt outlet orifices are provided in the crucible bottom, preferably in a circle or a polygon, each being provided with its own Laval-nozzle.

Crucibles of the kind described are discussed, for instance, in German Pat. Nos. 1,293,309; 1,293,972; and 1,293,973.

The drawings show embodiments of the invention, without thereby restricting the latter to the illustrations shown.

Figure 1:
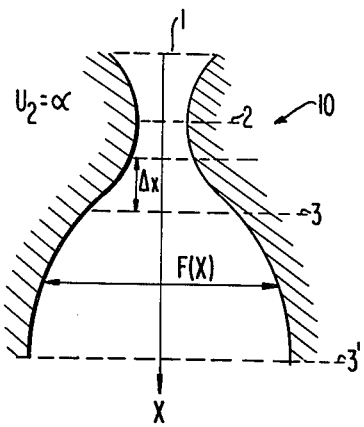
FIG. 1 is a schematic representation of a Laval-nozzle of the invention.

The inlet orifice in the x-direction of a Laval-nozzle 10 is denoted by 1 in FIG. 1, the location of the most narrow cross-section is referenced by 2, the range of the temperature drop by 3 and the outlet orifice by 3'. The function of the cross-section by means of which the temperature shock may be achieved is denoted by $F(x)$.

Figure 2:
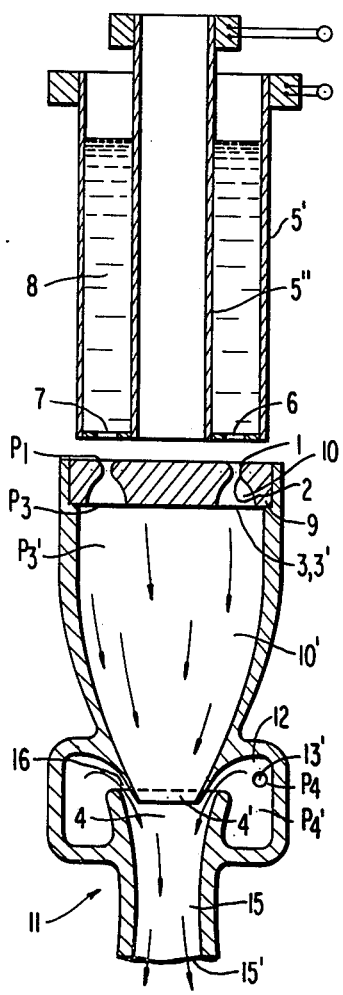
FIG. 2 shows schematically a device for the manufacture of fibers by means of a Laval-nozzle of the invention and with an injector connected thereto.

In the embodiment shown in FIG. 2, melting occurs by means of directly heating a noble metal crucible consisting of coaxial cylinders 5' and 5" and of a crucible bottom 6. The ohmic heat of the coaxial walls 5' and 5" traversed by electrical current and of the crucible bottom 6 provided with melt outlet orifices 7 is supplied to melt-material 8. The latter may be a ceramic substance in the embodiment shown.

A nozzle plate 9 is mounted at a spacing from and below the melt outlet orifices 7, each of which is associated with a Laval-nozzle in the nozzle plate 9.

Figure 3:
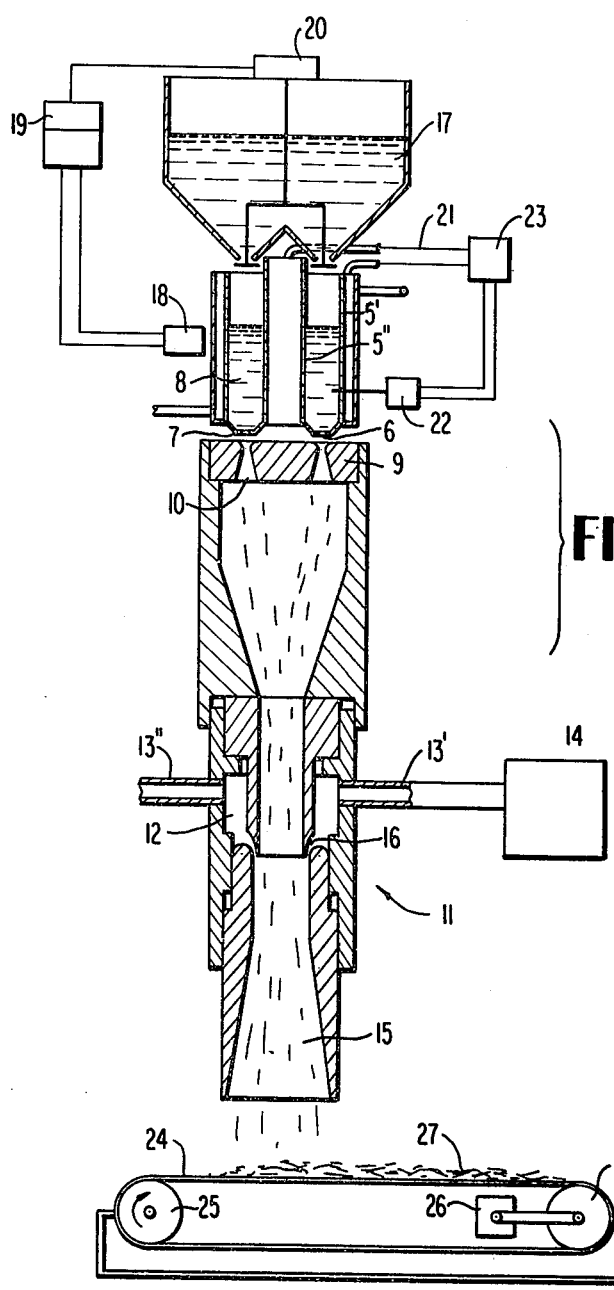
FIG. 3 is partly schematic and shows a complete device for the manufacture of fibers in accordance with the invention.

Nozzle plate 9 is the upper closure of an evacuation chamber 10' operating in concert with an injector 11 which is provided with an annular chamber 12 into which lead drive medium conduits 13' and 13" supplying a pressure medium such as compressed air from a compressed air source 14 (FIG. 3). Injector 11 is equipped with a Laval-nozzle 16 shaped similar to an annular slit.

The melt jet is sucked through the Laval-nozzles of the invention, which are symmertric with respect to rotation, and in the process are markedly accelerated. After passing through the phase of a fiber bundle or melt film, the state of the fiber will be frozen by means of the temperature shock of the invention.

Generation of an under-pressure $p_3'$ in an under-pressure chamber 10' common to all individual Laval-nozzles 10 in FIG. 1 is obtained by means of the supersonic injector 11.

Again, with $k = 1.4$ for air, $$T_3/T_1 = (p_3/p_1)^{0.286} \text{ and } T_3'/T_1 = (p_3'/p_1)^{0.286}$$

Pressure $p_4'$ will be equal to or less than $p_3'$ in the range of supersonic decrease 4' between the drive medium and the medium evacuated from the individual Laval-nozzles 10. To that end, the Laval-nozzle 16 shaped nearly like an annular slot in accordance with the invention will be such as regards cross-section that it will correspond to the same gas dynamic relations known per se that $p_4'$ will be less than $p_3'$. Furthermore, the pressure of the drive medium $p_4$ will be selected of such high value that the energy losses will be covered in mixing zone 4'.

For a pressure $p_4 = 6$ atm $= 6$ kg/cm$^2$, a Mach number of about 1.7 may be achieved at location 3'.

A subsequent subsonic diffuser 15 by means of conventional cross-sectional enlargement allows appreciable recovery of kinetic flow energy, so that the drive pressure $p_4$ to be applied remains relatively low and hence the overall efficiency of the device of the invention becomes very advantageous. By means of sufficient length and enlargement of the cross-section in accordance with the known laws of flow mechanics, one may raise $p_{15}'$ at the outlet of diffuser 15 to about atmospheric pressure $p_1$ (see U.S. Pat. No. 3,283,039 or Austrian Pat. No. 249,850).

A complete facility for the execution of the process is shown in FIG. 3. The same parts are referenced by the same numerals. The material being supplied in fluid or trickling but preferably not powdery form to the crucible is collected in a supply container or feeding funnel 17. The filled level of the crucible is constantly monitored by means of a level sensor 18 and a level regulator 19 actuating a metering device 20. A current regulator 23 controls the current supply via the supply lines 21 by means of a temperature monitor 22 and in such manner that the melt material at the bottom of the crucible is kept fluid enough to prevent clogging of the melt outlet orifices. For the embodiment shown, twenty melt outlet orifices 7 symmetric with respect to rotation are provided in the crucible bottom 6, and twenty corresponding Laval-nozzles 10 of the invention are mounted in a similar array in the nozzle plate 9.

The drive medium supply to the annular-slot shaped Laval-nozzle 16 or to the annular chamber 12 of injector 11 occurs from the compressed air source 14 via supply lines 13' and 13". A conveyor device consisting of a punched conveyor belt 24 moving in the direction of the arrow over rollers 25 is provided underneath subsonic diffuser 15. The drive is provided by a drive motor, preferably an electrical motor 26. The fibers manufactured in accordance with the invention's process fall from the lower end of subsonic diffuser 15 upon conveyor belt 24 and thereupon form a web 27 which may further be processed in known manner.

One may also operate the entire facility in an atmosphere of inert, protecting gas, for instance in order to make use of molybdenum as an economical, base crucible metal nevertheless of a high melting point. Devices in such cases have to be provided with means by which the produced fibers or webs may be removed in synchronism.

It will be obvious to those skilled in the art that various changes may be made without departing from the scope of the invention and the invention is not to be considered limited to what is shown in the drawings and described in the specification.

What is claimed is:

1. An apparatus for the manufacture of fibers from fusible low viscosity melts of inorganic mineral or metal materials or organic materials, comprising:

crucible means for heating the starting material above the melting point thereof and having an orifice in the bottom thereof;

Laval nozzle means for causing abrupt temperature drop of gases passing therethrough at supersonic speeds and being disposed in relation to said orifice to receive liquid passing therethrough;

means for permitting a gaseous flow medium to enter the inlet of said Laval nozzle means; and flow control means for causing said flow medium to pass through said Laval nozzle means at supersonic speed;

wherein said Laval nozzle means comprises a Laval nozzle having a narrow inner diameter part and an enlarged inner diameter part downstream of said narrow part, the shape of said enlarged part being so selected so as to achieve a sufficient temperature drop of the flow medium within a sufficiently short length of the enlarged part of said Laval nozzle, when said flow medium is flowing therethrough at a supersonic speed, to solidify the melt of starting material into the form of fibers before the surface tension of the melt forms the melt into droplets.

2. An apparatus in accordance with claim 1 wherein said crucible means comprises a pair of coaxial cylindrical walls and means connected to the top and bottom thereof for supplying electrical current thereto, wherein the material to be melted is introduced in the annular space between said inner and outer cylindrical walls.

3. An apparatus in accordance with claim 1 wherein said crucible means is made of noble metals or of alloys of noble metals with melting points above those of the materials to be melted therein.

4. An apparatus in accordance with claim 1 wherein said crucible means has a plurality of orifices in the bottom thereof arranged in a circle or polygon; and further including a plurality of said Laval nozzle means, each of said Laval nozzle means being associated with one of said orifices.

5. An apparatus in accordance with claim 4 wherein said plurality of Laval nozzle means are incorporated in a common nozzle plate which serves as a mounting therefor.

6. An apparatus in accordance with claim 1 wherein said flow control means comprises:

an evacuation chamber disposed downstream of said Laval nozzle means and communicating therewith;

supply means for supplying and feeding a gaseous drive medium into said evacuation chamber in a direction coincident with the direction of flow of said flow medium to create a negative pressure in said evacuation chamber; and diffuser means disposed downstream of said evacuation chamber and in communication therewith for slowing the flow rate of the gaseous media passing therethrough.

7. An apparatus in accordance with claim 6 wherein said supply means comprises an annular chamber surrounding said evacuation chamber, means for supplying said drive medium to said annular chamber under pressure and a ring nozzle means for feeding the drive medium from said annular chamber to said evacuation chamber at a supersonic speed.

* * * * *